(12) United States Patent
Vossberg et al.

(10) Patent No.: US 6,405,773 B1
(45) Date of Patent: Jun. 18, 2002

(54) RUN FLAT PNEUMATIC TIRE AND BAND ELEMENT THEREFOR

(75) Inventors: Stephen M. Vossberg, Medina; Charles D. Spragg, Hudson, both of OH (US); Edward G. Markow, Jensen Beach, FL (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 107 days.

(21) Appl. No.: 09/594,117

(22) Filed: Jun. 14, 2000

(51) Int. Cl.$^7$ .............................. B60C 9/18; B60C 17/00
(52) U.S. Cl. ...................... 152/516; 152/526; 152/527; 152/197; 156/148
(58) Field of Search ................................ 152/516, 517, 152/518, 526, 527, 197; 156/148

(56) References Cited

U.S. PATENT DOCUMENTS

| | | |
|---|---|---|
| 1,411,516 A | 4/1922 | Reider |
| 2,017,071 A | 10/1935 | Minor ............................ 18/59 |
| 3,842,885 A | 10/1974 | Alban ....................... 152/361 R |
| 3,850,219 A | 11/1974 | Snyder ................ 153/361 DM |
| 3,933,566 A | 1/1976 | Seiberling ................... 156/272 |
| 4,094,354 A | 6/1978 | Ferrell et al. ........... 152/361 R |
| 4,111,249 A | 9/1978 | Markow ................ 152/330 RF |
| 4,287,924 A | 9/1981 | Deck et al. .................. 152/153 |
| 4,318,434 A | 3/1982 | Markow ....................... 152/156 |
| 4,428,411 A | 1/1984 | Markow et al. ....... 152/330 RF |
| 4,456,048 A | 6/1984 | Markow et al. ....... 152/330 RF |
| 4,459,167 A | 7/1984 | Markow et al. .......... 156/110.1 |
| 4,673,014 A | 6/1987 | Markow ....................... 152/156 |
| 4,734,144 A | 3/1988 | Markow ....................... 156/123 |
| 4,794,966 A | 1/1989 | Markow ....................... 152/516 |
| 4,989,658 A | 2/1991 | Maathuis et al. ........... 152/533 |
| 5,368,082 A | 11/1994 | Oare et al. ................... 152/517 |
| 5,427,166 A | 6/1995 | Willard, Jr. .................. 152/454 |
| 5,795,417 A | 8/1998 | Damke et al. ............... 152/527 |
| 5,879,484 A | 3/1999 | Spragg et al. ............... 152/516 |
| 6,148,885 A | * 11/2000 | Spragg ........................ 152/197 |

FOREIGN PATENT DOCUMENTS

| | | |
|---|---|---|
| EP | 0 191 124 | 8/1986 |
| EP | 0 400 859 | 5/1990 |
| EP | 0 537 780 | 4/1993 |
| EP | 0 853 009 A2 | 11/1997 |
| EP | 0 953 436 A2 | 11/1999 |
| EP | 0 974 449 A3 | 4/2000 |
| EP | 1 010 549 A2 | 6/2000 |
| JP | 63141809 | 12/1986 |

OTHER PUBLICATIONS

Derwent Abstract of EPO Publication 0 191 124.
**Derwent Abstract provides English language explanation per 37CFR 1.98(a)(3).

* cited by examiner

*Primary Examiner*—Jeff H. Aftergut
*Assistant Examiner*—Justin Fischer
(74) *Attorney, Agent, or Firm*—Thomas R. Kingsbury; Michael Sand; John H. Hornickel

(57) ABSTRACT

A pneumatic tire is reinforced by a thin annular composite band embedded in the crown portion of the tire to enable the tire to resist compressive forces in the tire when in an uninflated condition. The band is formed of a plurality of wound layers of first and second resin coated fiber tows wherein the first tow is formed of fibers twisted at a greater angle than the fibers in the second tow. Layers of the first tow are located adjacent the neutral axis of the band to provide interlaminar shear strength with the tow layers located adjacent the inner and outer surfaces of the band being formed predominately of the second tow to provide a high level circumferential stiffness. The intermediate tow layers are formed of both type of tows to provide a transition zone between the central interlaminar shear strength and the outer circumferential stiffness.

12 Claims, 4 Drawing Sheets

RUN FLAT PNEUMATIC TIRE AND BAND ELEMENT THEREFOR

BACKGROUND OF THE INVENTION

1. Technical Field

The invention relates to vehicle tires and particularly to a run flat pneumatic tire containing a thin annular band which acts as a structural compression member when the tire is in the unpressurized or uninflated state to enable the tire to run in the unpressurized condition. More particularly, the invention relates to a band element which is formed as a composite structure of a plurality of helically wound fiber tows contained in a resin matrix wherein a first group of the fiber tows are located adjacent the neutral axis of the band to provide increased interlaminar shear strength with a second group of fibers arranged adjacent the outer and inner surfaces of the band to create a high level of circumferential stiffness.

2. Background Information

Various tire constructions have been devised over the years which enable a tire to run in an under-inflated or non-inflated condition such as after receiving a puncture and loss of pressurized air for extended periods of time and at relatively high speeds. This enables the operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the side walls of the tire which enable the tire to support the vehicle weight even with the complete loss of internal air pressure. Examples of such prior art run flat tire constructions which use such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164 ; and 4,929,684.

In addition to these prior art run flat tires, various run flat tire constructions have been developed which utilize a thin annular band which extends circumferentially throughout the tire beneath the tread area. Examples of such banded run flat tires are shown in U.S. Pat. Nos. 4,111,249; 4,318,434; 4,428,411; 4,459,167; 4,734,144 4,428,411; 4,673,014; 4,794,966 ; and 4,456,048.

Banded tires have been fabricated with band materials made of steel, aluminum, titanium, and epoxy and thermoplastic composites with glass, KEVLAR (aromatic polyamide) and graphite fiber reinforcement. The common failure mode with these lightweight, laminated band constructions is interlaminar shear along the band's primary bending neutral axis. This is a fatigue failure and is directly related to the spectrum of cyclic operating stress. As in all fatigue failures, the lower the stress, the longer the operating life.

In summary, the present invention provides a band element for a run flat tire which has both increased interlaminar shear strength and increased circumferential strength or stiffness in order to reduce failure of the band by the use of two types of fiber tows embedded in the resin matrix of the band.

SUMMARY OF THE INVENTION

The present invention provides a band element for a run flat pneumatic tire which is formed as a composite containing at least two different groups or types of fiber tows encased in a resin matrix with one group of the fiber tows being located adjacent the neutral axis of the band to provide increased interlaminar shear strength and with a second group of the fiber tows being located adjacent the inner and outer surfaces of the band to provide increased circumferential stiffness.

Another aspect of the invention is to provide a band that features both the desired levels of bending stiffness and of shear strength that is sufficient to avoid interlaminar shear crack initiation and growth during both the normal and typical life of the inflated tire and also during the desired life of the tire when operated in the run flat condition. This is in contrast to many of the prior art banded tires which are designed to meet only one of the conditions and not of both of the conditions, while providing the necessary tire-to-ground contact zone for development of tractive control forces, the desired level of ride comfort, and acceptable level of generated noise.

Still another aspect of the invention provides forming the first group of fiber tows of twisted fibers oriented at an angle within a range of 20° and 60° with the second group of fiber tows being formed of twisted fibers twisted at an angle with a range of 0° and 25°.

Another feature of the invention is to provide a band element in which a plurality of chopped fibers are interspersed between the layers of tows within the matrix, which fibers extend between the tow layers to increase interlaminar shear fatigue strength and laminate stiffness to resist the various peel stresses imparted thereon.

Another aspect of the invention is to form the fiber tows of fuzzy fibers which have a plurality of frayed fibers extending outwardly from the tows and crossing over into adjacent tows, again to increase the interlaminar shear strength and to resist peel stresses between the tow layers.

Still another aspect of the invention is to arrange the individual tows in a nesting relationship with the adjacent tows of adjacent layers in order to reduce the formation of resin only planes parallel to the band surface, which planar zones or areas are susceptible to cracking and interlaminar shear.

A further aspect of the invention is to provide a run flat band in which the two distinctly different groups of fibers are arranged in such a manner as to provide a gradual decrease in circumferential stiffness through the thickness of the band decreasing toward the central region of the band while at the same time there is a gradual increase in interlaminar shear strength towards the neutral axis of the band.

Thus, the present invention provides a band element which can be manufactured in an efficient and effective manner for subsequent incorporation into a run flat tire wherein the band has maximum interlaminar shear strength adjacent the neutral axis of the band which decreases gradually towards the inner and outer surfaces while providing maximum circumferential stiffness adjacent the inner and outer band surfaces which decreases gradually towards the center or neutral axis of the band.

The foregoing advantages, construction, and operation of the present invention will become more readily apparent from the following description and accompanying drawings.

DESCRIPTION OF THE PREFERRED EMBODIMENTS

Figure 1:
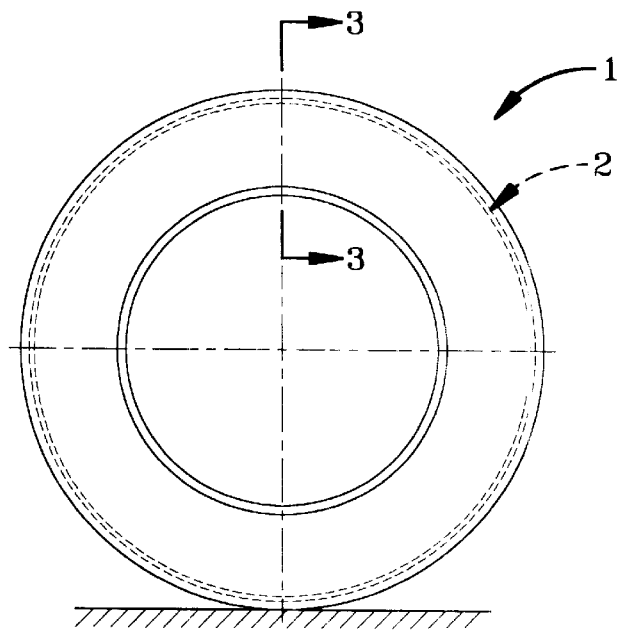
FIG. 1 is a diagrammatic side elevational view of a pneumatic tire having the improved run flat band incorporated therein.

FIG. 1 is a diagrammatic elevational view of a pneumatic tire indicated generally at 1, having the improved run flat band indicated generally at 2 incorporated therein. Tire 1 is of a usual construction and includes a body ply carcass 3 (FIG. 3) consisting of an innerliner 4, at least one body ply 5, sidewalls 6 extending from a crown portion 7 of the tire to bead packages 8. Bead packages 8 will typically include a bead 9 and a bead filler 10 and may have gum abrasion strips and other components therein, all of which are well known in the tire building art. Body ply carcass 3 is assembled and then molded with a typical tread package 11 which will usually contain a tread strip 12 and various reinforcing belts (not shown) contained therein. Band 2 is molded into the crown portion of the tire between tread package 11 and carcass 3 which is accomplished in the usual tire mold.

Figure 2:
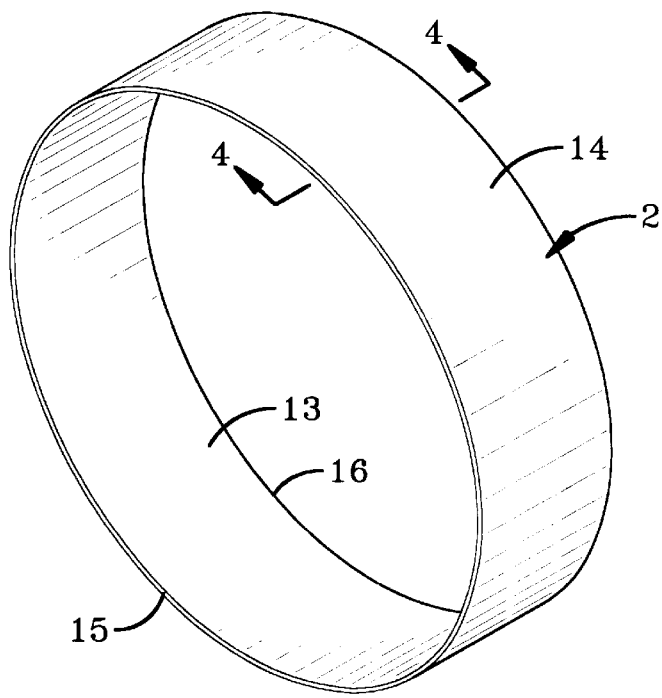
FIG. 2 is a perspective view of the run flat band of FIG. 1.
Figure 3:
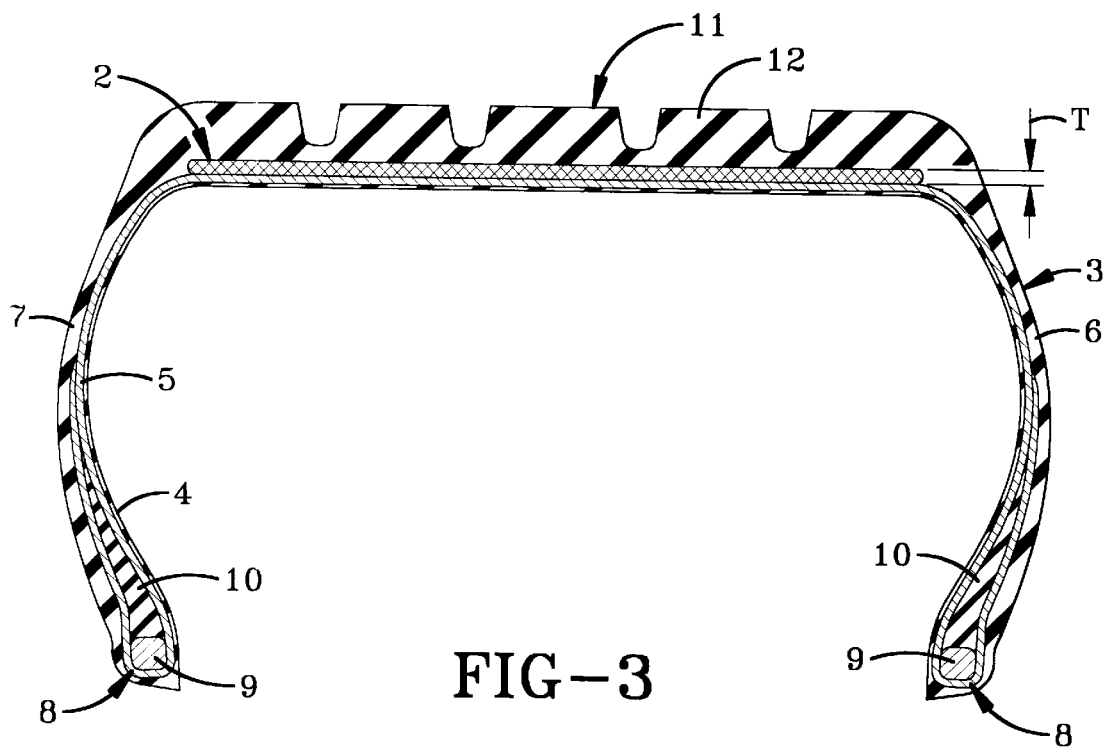
FIG. 3 is an enlarged sectional view taken on line 3—3, FIG. 1.
Figure 5:
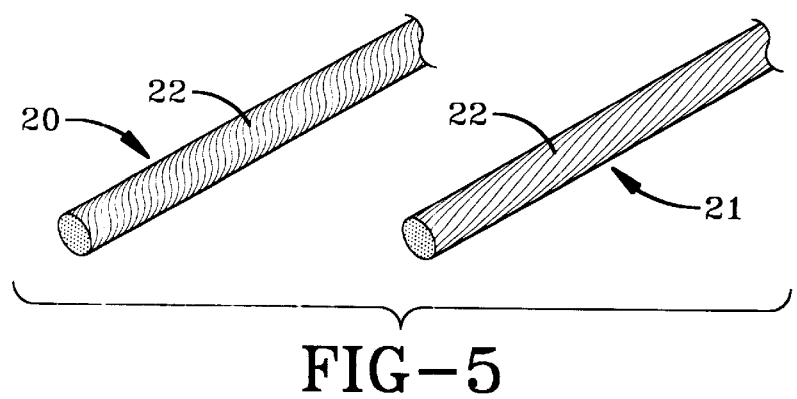
FIG. 5 is a diagrammatic perspective view of two of the stiffening tows incorporated in the band of FIG. 4.

Band 2 (FIG. 2) has a thin, annular, uniform configuration with an inner surface 13 and an outer surface 14 and end edges 15 and 16 with a uniform thickness T measured between inner and outer surfaces 13 and 14, as shown in FIG. 3. In accordance with the invention, band 2 includes at least two different fiber tows indicated at 20 and 21 (FIG. 5). Each tow, is formed of bundles of individual fibers 22 which could be steel, aluminum, fiberglass, graphite, an aromatic polymide, etc. These fibers are twisted into bundles hereinafter referred to as tows. In accordance with another feature of the invention, the tows have different tightness or degrees of twists in order to achieve the desired results when incorporated into band 2. Tow 20 will have a tighter helical twist than tow 21 with the fibers having a twist oriented at an angle to the circumference preferably within the range of 20° and 60°, with the preferred angle being approximately 45°. Tow 21 will have a lesser or looser twist than that of tow 20 with the individual fibers having a twist within the range of 0° and 25° with the preferred angle of twist being approximately 10°. Even though tow 21 is defined as being formed of twisted fibers, it could, in certain instances, have the fibers arranged parallel having a 0° twist. It has been found that forming band 2 of a combination of at least two different fiber tows 20 and 21 having different degrees of twist and by placing a concentration of the tighter twisted tows 20 adjacent a neutral axis 23 of the band it provides increased interlaminar shear strength adjacent the neutral axis which is the location where the greatest amount of shear stresses occur. Utilizing the looser twisted tow 21 in greater concentrations near the inner and outer surfaces of the band provides for increased circumferential stiffness which are the areas on which such stresses are imparted.

Figure 4:
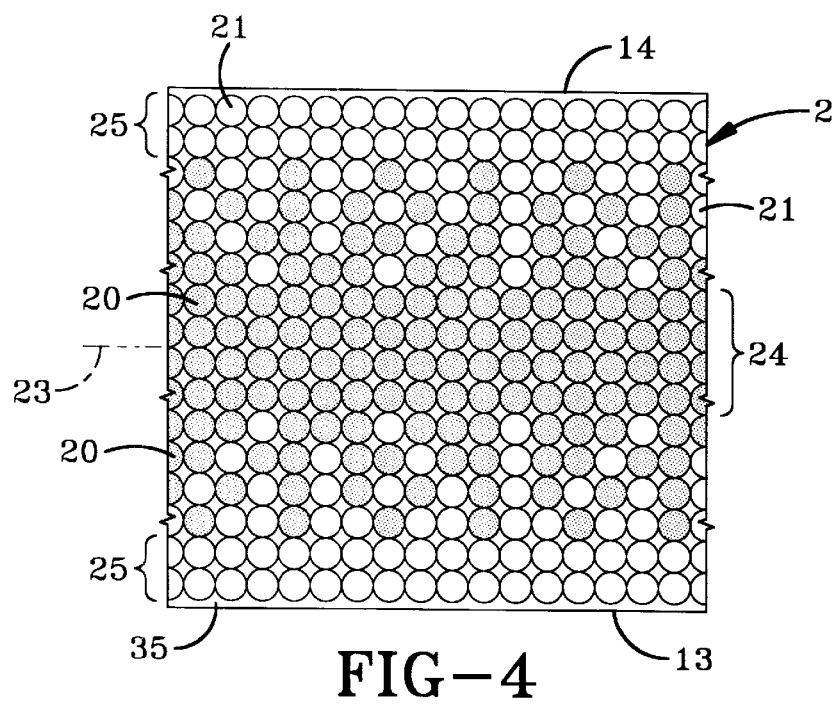
FIG. 4 is a greatly enlarged diagrammatic sectional view taken on line 4—4 FIG. 2.

A first embodiment of band 2 is shown in FIG. 4 which diagrammatically shows a first group of fiber tows 20 indicated at 24, arranged in several layers, preferably without any fiber tows 21 being incorporated therein, adjacent neutral axis 23. A second group of fiber tows 21 indicated at 25, form the inner and outer layer and preferably are formed entirely of fiber tows 21. The various layers inbetween groups 24 and 25 increase in percentage of fiber tows 21 outwardly from the innermost group 24. Thus, as the layers move outwardly from central axis 23, the amount of fiber tows 21, incorporated therein increases gradually from no fiber tows 21 in group 24 to entirely all fiber tows 21 in group 25. This structure provides for the desired high interlaminar shear strength adjacent axis 23, and the high circumferential stiffness at inner surface 13 and outer surface 14.

Figure 12:
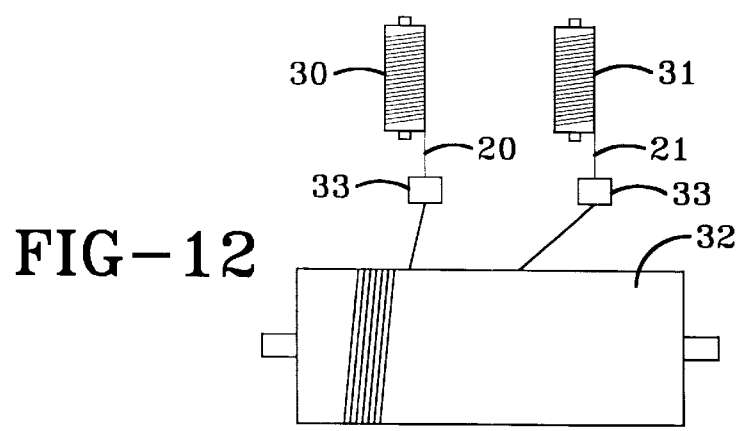
FIG. 12 is a diagrammatic view showing the method of forming the band with the two distinct groups of fiber tows and resin matrix.

FIG. 12 shows a preferred method for forming band 2 wherein two supply reels 30 and 31 containing fiber tows 20 and 21 respectively, are wound about a mandrel 32 after passing through a liquid supply or bath 33 of a resin material for coating the tows with resin. The individual tows are wrapped tightly adjacent to each other and on top of each other when forming the multiple layers when helically wound about mandrel 32, to form a resin matrix 35 completely encasing tows 20 and 21 therein. The resin can be of various types of thermoplastic or thermoset materials and solidifies to form the matrix after being cured in a heated environment. Although the individual tows are shown as circular in the drawings they may become oval-shaped or have a flattened configuration when tightly wound about the mandrel and can be in contact with adjacent convolutions.

Figure 6:
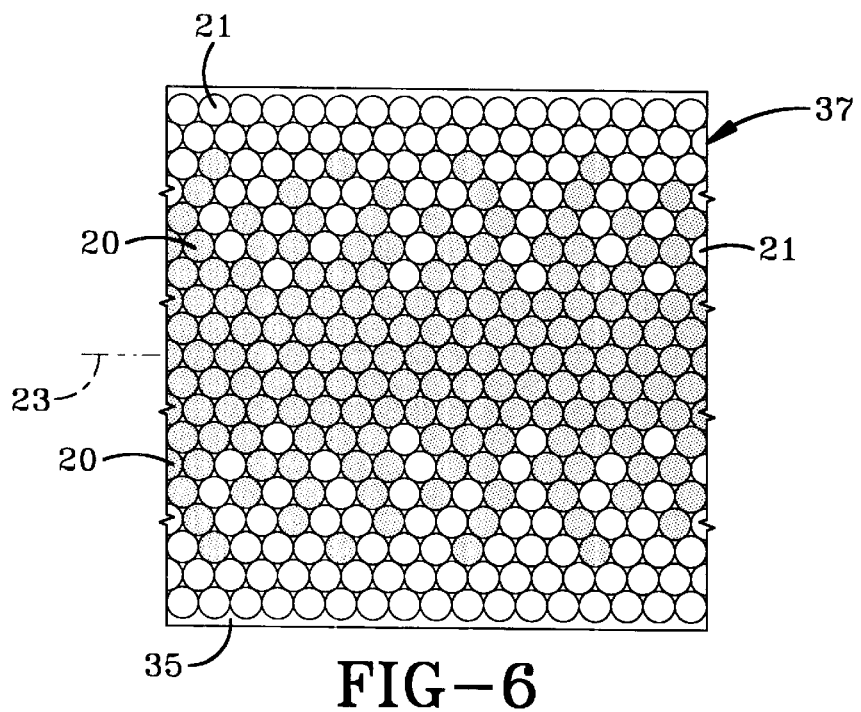
FIG. 6 is a diagrammatic sectional view similar to FIG. 4 of a run flat band having a modified arrangement of stiffening tows incorporated therein.
Figure 7:
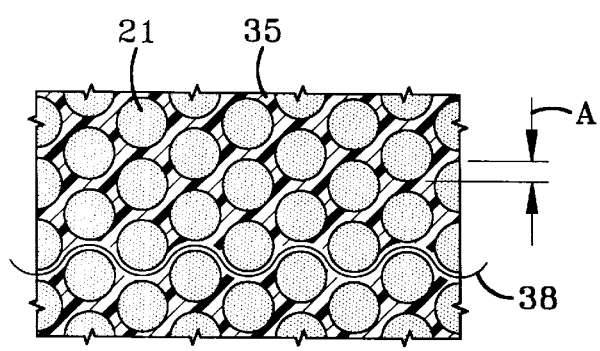
FIG. 7 is a greatly enlarged fragmentary sectional view of a portion of FIG. 6 showing the stiffening tows in a nested relationship.

A modified run flat band is indicated at 37, and is shown in FIGS. 6 and 7 and differs from band 2 in that the individual fiber tows 20 and 21 are wrapped about mandrel 32 in a manner to form a nesting relationship as shown in an exaggerated condition in FIG. 7. FIG. 7 shows this nesting relationship by overlapping distance A and by wavy line 38 which shows that this nesting configuration completely avoids the formation of any plane or path which is parallel with neutral axis 23 that is formed entirely of resin. This reduces considerably the propensity of the matrix to crack due to the elimination of any planar areas formed entirely of resin.

Figure 8:
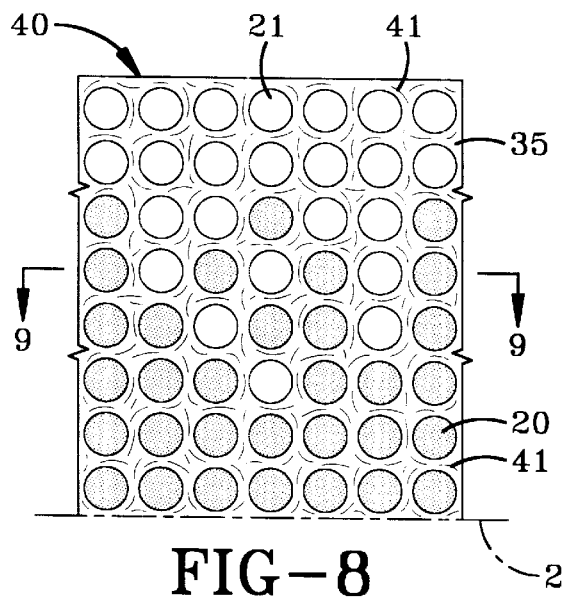
FIG. 8 is a diagrammatic sectional view similar to FIGS. 4 and 6 of another run flat band construction incorporating chopped fibers interspersed between the stiffening tows.
Figure 9:
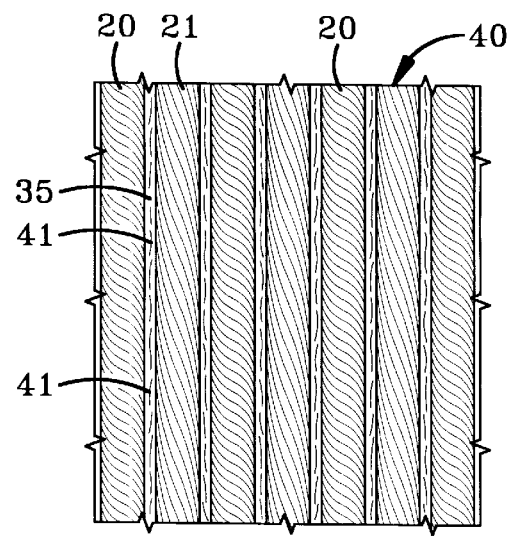
FIG. 9 is a enlarged fragmentary diagrammatic view looking in the direction of arrows 9—9, FIG. 8, with portions broken away and in section.

A further modification of the improved run flat band is indicated at 40, and shown in FIGS. 8 and 9. In this band construction, a plurality of extremely short or "chopped" fibers 41 are dispersed throughout resin matrix 35 and extend across and between the various layers of fiber tows, again to avoid a continuous plane or area formed entirely of resin which is parallel to band axis 23, thereby reducing the chance of cracking due to interlaminar shear stress. These fibers are relatively short, having a length generally less than 0.05 inches, and have an extremely small diameter, for example, 0.007 inches.

Figure 10:
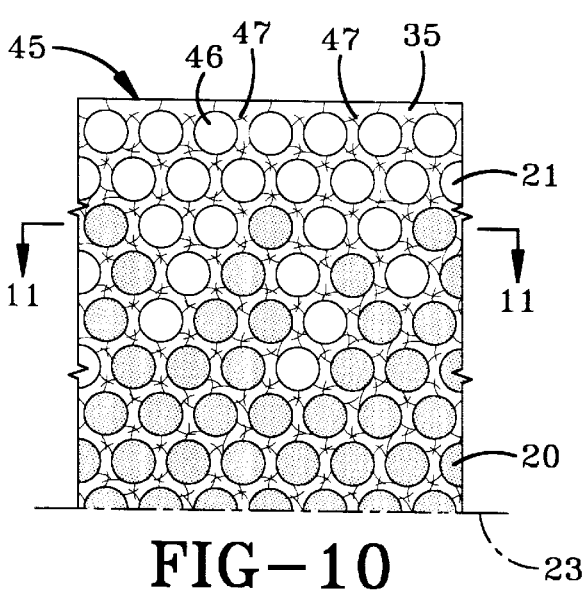
FIG. 10 is a diagrammatic sectional view similar to FIGS. 4, 6, and 8 showing a further modified run flat band construction using stiffening tows containing fuzzy fibers.
Figure 11:
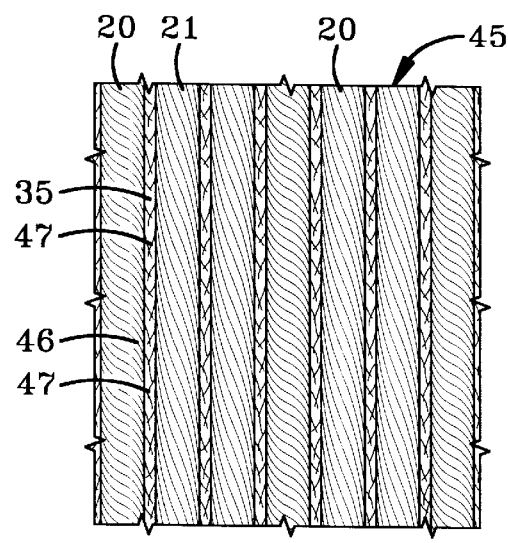
FIG. 11 is a diagrammatic view similar to FIG. 9 taken on line 11—11, FIG. 10 with portions broken away and in section.

Another band construction is indicated generally at 45, and shown in FIGS. 10–11. In this embodiment, fiber tows 21 and 22 are formed of individual fuzzy fibers 46 which are fibers having frayed fibers 47 protruding from the main body of the fiber. These frayed fibers extend into the surrounding resin matrix 35 to increase the strength thereof as do chopped fibers 41, by eliminating the formation of any planar segments of continuous, solid resin material. The frayed fibers 47 extend in all directions from the fiber core and across the intervening resin intermingling with the adjacent frayed fibers of the adjacent fiber tows, to reduce cracking due to interlaminar shear along boundaries containing unreinforced resin material.

In summary, the improved run flat band enables a pneumatic tire to be produced which is capable of running in an underinflated or uninflated condition wherein the band has increased interlaminar shear strength or fatigue resistance and increased circumferential compressive strength or stiffness by the use of at least two separate types of fiber tows having different degrees of twists with the more tightly twisted fibers being located adjacent the neutral axis of the band and the more loosely twisted fiber tows being located in a greater percentage near the inner and outer surfaces of the band, and with the intermediate areas therebetween containing a combination of the two different types of fiber tows with the number of loosely twisted tows increasing radially outwardly from the neutral axis to the inner and outer band surfaces.

While the embodiments of the invention have been described the invention is not limited thereto.

What is claimed is:

1. In a pneumatic tire including an elastomeric casing with a tread formed in a crown portion thereof and sidewalls extending from the crown portion to generally circular beads adapted to seat themselves in an airtight secured relationship with a wheel, a thin annular composite band embedded in the crown portion of the tire for resisting compressive forces on the tire when uninflated;

said band having an axial width and a radial thickness with a neutral axis extending generally through the center of the band, said band further including:

a plurality of twisted fibers forming first and second tows, said tows being helically wound to form a plurality of wound layers of said fiber tows contained in a resin matrix, layers of the first fiber tows being located primarily adjacent the neutral axis and having a higher level of shear strength than layers of the second fiber tows located primarily in outermost layers of the band having a higher level of circumferential stiffness than said first layer of fiber tows.

2. The pneumatic tire defined in claim 1 wherein the fibers in the first tow are arranged in a helical twist oriented at an angle to the circumference within the range of 20° and 60°.

3. The pneumatic tire defined in claim 2 wherein the fibers in the first tows are oriented at an angle of approximately 45°.

4. The pneumatic tire defined in claim 1 wherein the fibers in the second tows are arranged in a helical twist oriented at an angle to the circumference within the range of 0° and 25°.

5. The pneumatic tire defined in claim 4 wherein the fibers in the second tows are oriented at an angle of approximately 10°.

6. The pneumatic tire defined in claim 1 wherein the fibers of the first and second tows are formed of a material selected from the group consisting of steel, aluminum, fiberglass, graphite and an aromatic polyamide.

7. The pneumatic tire defined in claim 1 wherein certain of the first and second fiber tows are nested between pairs of fiber tows of adjacent layers of said tows.

8. The pneumatic tire defined in claim 1 wherein certain of the fibers of at least one of said first and second fiber tows are fuzzy fibers having a plurality of frayed fibers extending outwardly from said tow.

9. The pneumatic tire defined in claim 1 wherein a plurality of chopped fibers are contained in the resin matrix and extend between adjacent layers of the tows.

10. The pneumatic tire defined in claim 9 wherein the chopped fibers have a length less than 0.05 inches.

11. The pneumatic tire defined in claim 1 wherein the resin is a thermoplastic or thermoset material.

12. The pneumatic tire defined in claim 1 wherein the layers of tows adjacent to the neutral axis are formed predominantly of the first fiber tow and the layers of tows adjacent inner and outside surfaces of the band are formed predominantly of the second fiber tow, and wherein both first and second fiber tows are co-mingled in layers intermediate said inner layers of said first tow and the outer layers of said second tow, with the percentage of second tows in said intermediate layers increasing outwardly from the neutral axis toward the inside and outside surfaces of the band.

* * * * *